United States Patent [19]
Kasowski et al.

[11] Patent Number: 6,025,419
[45] Date of Patent: *Feb. 15, 2000

[54] FLAME RETARDANT RESIN COMPOSITIONS

[75] Inventors: Robert Valentine Kasowski, West Chester, Pa.; Marvin M. Martens, Vienna, W. Va.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/833,571

[22] Filed: Apr. 7, 1997

[51] Int. Cl.⁷ ...................................................... C08K 3/10
[52] U.S. Cl. ......................... 524/100; 524/386; 524/387; 524/406; 524/494
[58] Field of Search .................................... 524/100, 386, 524/387, 406, 436, 437, 494

[56] References Cited

U.S. PATENT DOCUMENTS

| | | | |
|---|---|---|---|
| 3,458,470 | 7/1969 | Edgar | 260/37 |
| 4,257,931 | 3/1981 | Granzow | 524/100 |
| 4,298,518 | 11/1981 | Ohmura et al. | 260/32.6 |
| 4,314,929 | 2/1982 | Mahoney | 524/606 |
| 4,338,421 | 7/1982 | Maruyame et al. | 525/397 |
| 4,528,304 | 7/1985 | Yoshimura et al. | 524/606 |
| 4,877,823 | 10/1989 | Plachetta et al. | 524/414 |
| 4,992,481 | 2/1991 | Bonin et al. | 521/54 |
| 5,424,344 | 6/1995 | Lewin | 524/419 |
| 5,691,404 | 11/1997 | Kasowski et al. | 524/100 |
| 5,859,099 | 1/1999 | Kasowski | 524/100 |

FOREIGN PATENT DOCUMENTS

| | | | |
|---|---|---|---|
| 2130793 | 6/1971 | Germany . | |
| 2150484 | 10/1971 | Germany . | |
| 44 36 281 A1 | 4/1996 | Germany | C08L 77/00 |
| WO 96/09344 | 3/1996 | WIPO | C08K 13/04 |
| WO 97/23565 | 7/1997 | WIPO | C08L 67/00 |
| WO 98/08898 | 3/1998 | WIPO | C08K 9/04 |

OTHER PUBLICATIONS

PCT, International Search Report for PCT/US98/06736, dated Jul. 27, 1998.

Anne E. Lipska, The Fire Retardance Effectiveness of high Molecular Weight, High Oxygen Containing Inorganic Additives in Cellulosic and Synthetic Materials, Combustion Institute Arizona State University, Western States Section, 1–39, 1973.

*Primary Examiner*—Veronica P. Hoke
*Attorney, Agent, or Firm*—William H. Hamby

[57] ABSTRACT

This invention relates to flame retardants for polyester and polyamide compositions, and specifically relates to compositions containing (1) about 30 to about 70 weight percent of a polyester or a synthetic, aliphatic polyamide and synthetic aliphatic, aromatic polyamide copolymers or a mixture thereof; (2) about 15 to about 40 weight percent of glass or mineral reinforcing agent; and (3) a flame retardant of (a) about 5 to about 45 weight percent of melamine polyphosphate; (b) about 15 to about 30 weight percent of melamine polyphosphate and up to about 10 weight percent of a charring catalyst; (c) about 15 to about 30 weight percent of melamine polyphosphate, up to about 10 weight percent of a charring catalyst and up to about 10 weight percent of a char former, wherein all percents by weight are based on the total weight of (1)+(2)+(3) only.

14 Claims, No Drawings

FLAME RETARDANT RESIN COMPOSITIONS

FIELD OF THE INVENTION

This invention relates to resin compositions which have a combination of good physical properties and good flame retardance.

TECHNICAL BACKGROUND

Synthetic resins, including polyesters and aliphatic and aromatic polyamides, such as nylon-6,6 and nylon-6, and copolymers thereof, are often used for molded articles and fibers. In many uses, particularly for molded articles, it is preferred if the resin has improved resistance to fire, compared to the resin alone. This is often attained by the addition of various agents which improve the basic fire resistance (i.e., flame retardance) of the resin, but sometimes these agents degrade or diminish other physical properties of the resin. Since resins are widely used, compositions which have improved fire resistance but yet retain the desirable physical properties of the resin are constantly being sought.

German Patents 2,150,484 and 2,130,793, and A. E. Lipska, Comb. Inst. Arizona State Univ., West. State Sect. Combust, Inst. WSCI, 1973, report that certain tungsten compounds can be used in various ways to improve the fire resistance of polyamides. The combinations of agents described hereinafter are not disclosed in these references.

U.S. Pat. No. 4,298,518 discloses compositions containing polyamides and melamine cyanurate, which are said to have good fire resistance.

U.S. Pat. No. 3,458,470 discloses compositions containing polyamides and a variety of tungsten or molybdenum compounds, including silico- and phospho-tungstic acids. These compositions are said to have good resistance to discoloration and be stable to light.

Melamine phosphate may be added to synthetic resins to improve the flame retardancy of the resins, but when heated to normal engineering polymer processing temperatures the melamine phosphate gives off so much water that the resultant mixture of the resin and the melamine phosphate has very poor physical properties.

What are needed. therefore, are flame retardant resin compositions which do not have the problems and deficiencies of the prior art.

SUMMARY OF THE INVENTION

This invention relates to flame retardants for polyester and polyamide compositions wherein the polyamides are synthetic aliphatic polyamides, and synthetic aliphatic aromatic polyamide copolymers, and mixtures thereof, and specifically relates to compositions containing (1) about 30 to about 70 weight percent of a polyester or a synthetic, aliphatic polyamide or a mixture thereof; (2) about 15 to about 40 weight percent of glass or mineral reinforcing agent; and (3) a flame retardant of (a) about 20 to about 45 weight percent of melamine polyphosphate; (b) about 15 to about 30 weight percent of melamine polyphosphate and up to about 10 weight percent of a charring catalyst; (c) about 15 to about 30 weight percent of melamine polyphosphate, up to about 10 weight percent of a charring catalyst and up to about 10 weight percent of a char former, wherein all percents by weight are based on the total weight of (1)+(2)+(3) only.

These compositions exhibit good fire resistance and are useful as molding resins. These compositions may also include other additional fillers and additives as are commonly known in the art.

DETAILED DESCRIPTION

The composition described herein is a resin composition having both good physical properties and good flame retardancy. The composition has three components (1) a polyester or certain polyamides or a mixture thereof; (2) a glass or mineral reinforcing agent; and (3) a flame retardant which includes a melamine polyphosphate compound and optionally a charring catalyst, or a charring catalyst and a char former.

The first component is a polyester or certain polyamides or a mixture thereof, which is present in an amount of about 30 to about 70 weight percent of the composition.

"Polyester" as used herein includes polymers having an inherent viscosity of 0.3 or greater and which are, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclohexane dimethanol and aliphatic glycols of the formula $HO(CH_2)_nOH$ where n is an integer of 2 to 10. Up to 50 mole percent of the aromatic dicarboxylic acids may be replaced by at least one different aromatic dicarboxylic acid having from 8 to 14 carbon atoms, and/or up to 20 mole percent may be replaced by an aliphatic dicarboxylic acid having from 2 to 12 carbon atoms.

The most common polyester compositions are based on polyethylene terephthalate homopolymers, polybutylene terephthalate homopolymers, polyethylene terephthalate/polybutylene terephthalate copolymers, polyethylene terephthalate/polybutylene terephthalate mixtures and mixtures thereof, although other polyester may be used as well, alone, in combination with each other, or in combination with those polyesters listed above.

"Synthetic polyamide", as used herein, includes a polymer which is made by man, and does not include natural fibers such as wools or silks. By an "aliphatic polyamide" is meant a polymer which has repeat units which include amide groups in the main chain, and in which at least some, preferably at least 50 mole percent, of these amide groups (through the nitrogen atoms and/or carbonyl carbon atoms of the amide groups) are connected to aliphatic carbon atoms. Preferred polyamides include nylon-6,6, nylon-6, nylon 6,12, and copolymers of nylon-6,6 and nylon 6. Nylon-6,6 and nylon-6, and copolymers thereof, are especially preferred and nylon-6,6 is more preferred.

By "aliphatic aromatic polyamide copolymers" is meant a polymer which has repeat units which include amide groups in the main chain, and in which at least some of these amide groups (through the nitrogen atoms and/or the carbonyl carbon atoms of the amide groups) are connected to aromatic carbon atoms. Preferred "aliphatic aromatic polyamides copolymers" include nylon 6T/6I (polyhexamethylene terephthalamide/polyhexamethylene isophthalamide 5copolymer), 6T/6,6 (polyhexamethylene terephthalamide/polyhexamethylene adipamide copolymer), 6T/6,10 (polyhexamethylene terephthalamide/polyhexamethylene decanediamide copolymer), 6T/6,12 (polyhexamethylene terephthalamidelpolyhexamethylene dodecanediamide copolymer), etc.

The second component in the invention is a reinforcing agent, such as a glass or mineral reinforcing agent, and which may include glass, carbon, mica and/or aramid fibers.

The reinforcing agent, which is present in an amount of about 15 to about 40 weight percent, is important in obtaining the desired combination of both good physical properties and improved fire resistance in the inventive composition.

The third component of the invention is a flame retardant that includes a melamine polyphosphate compound and optionally either a charring catalyst or a charring catalyst and a char former. In one embodiment, the melamine polyphosphate compound is doped with a charring catalyst or with a charring catalyst and a char former.

The melamine polyphosphate compound is the melamine salt of of polyphosphoric acid. The polymeric chain of polyphosphoric acid is ideally $(HMPO_3)n$, where n is greater than 2 and M stands for melamine. Melamine pyrophosphate is defined as $H_4M_2PO_7$, where M stands for melaniine. The polymeric sodium salt is $(NaPO_3)n$. It is only required that the average chain length be greater than 2, some pyro and mono phases will ordinarily result during synthesis of melamine polyphosphate.

The flame retardant component typically contains about 20 to about 45 weight percent of the melamine polyphosphate compound, based on the total weight of the composition. When less than 20 weight percent of the melamine polyphosphate compound is present, the composition is not effective as a flame retardant under UL94. However, lower amounts of the flame retardant may be effective under a flame retardant test less stringent that UL94, such as the glow wire test of International Standard IEC 695-2-1/0 1994. For synthetic polyamides, in practice the upper amount of the melamine polyphosphate component is about 35 weight percent, because while it may be possible to use greater that 30 weight percent of a melamine polyphosphate compound, such amounts are not deemed to be practical because of the high costs of using such an amount of the melamine polyphosphate compound. However, even greater amounts of the melamine polyphosphate may be used, especially when a polyester is used.

The preferred amount of flame retardant used with aliphatic polyamides is 25–30%.

An optional ingredient of the inventive composition that is part of the flame retardant is a charring catalyst. When melamine polyphosphate is used as the melamine compound, the presence of the charring catalyst is not essential to the invention, but its use in conjunction with melamine polyphosphate greatly reduces the amount of melamine polyphosphate needed, as discussed below.

As used herein, the term "charring catalyst" includes metal salt of a tungstic acid or a complex oxide acid of tungsten and a metalloid, a tin oxide salt such as sodium tin oxide, and/or ammonium sulfamate. Preferred metal salts include alkali metal salts of a tungstic acid, with sodium tungstate being especially preferred. By a complex oxide acid of tungsten and a metalloid is meant a complex oxide acid formed by a metalloid such as phosphorous or silicon and tungsten. Preferred complex oxide acids include silicotungstic acid and phosphotungstic acid, with silicotungstic acid being especially preferred. If the charring catalyst is present as part of the flame retardant component of the inventive composition it is present in an amount up to about 10 weight percent based on the total weight of the inventive composition. A preferred range is from about 0.1 to about 10 weight percent, with a more preferred range being from about 0. to about 2 weight percent.

Another optional ingredient of the inventive composition that is part of the flame retardant is a char former such as a polyhydric alcohol. Other examples include novolac, vinyl alcohols and starches. In the present invention, it is preferred that the polyhydric alcohol be penterythritol and dipenterythritol. If it is present in the composition, the char former is present in amounts of up to 10 weight percent based on the total weight of the inventive composition. A preferred range is from about 0.1 to about 10 weight percent, with a more preferred range being from about 0.1 to about 2 weight percent.

Still other optional ingredients of the inventive composition that are part of the flame retardant are melamine cyanurate, melamine, and zinc borate.

By "melamine compound doped with a charring catalyst" is meant a melamine phosphate compound such as melamine pyrophospate that is made such that the charring catalyst is bound to the melamine polyphosphate. The melamine compound doped with a charring catalyst may be made by preparing an aqueous solution of melamine, preparing an aqueous solution of silicotungstic acid or phosphotungstic acid, and preparing an aqueous solution of a phosphorous acid, such as polyphosphoric acid. The tungstic acid solution is added to the phosphorous solution, and then that mixture is added to the melamine solution, wherein melamine pyrophosphate is formed. The resulting solution is vacuum dried to produce the doped melamine polyphosphate compound. The mole ratio of the melamine to phosphorous in the solution should be from 2:1 to 1:2. The number of moles of the charring catalyst should be from 0.01 to 0.5 moles per mole of melamine polyphosphate compound, and preferably 0.1 moles per mole of melamine compound. There may not be a 100% formation of melamine polyphosphate when the doped melamine compound is made, so that while the doped melamine compound is primarily melamine polyphosphate, it may also include melamine phosphate and/or melamine pyrophosphate.

The melamine compound that is doped with a charring catalyst may also be made by contacting, in an aqueous medium, melamine and silicotungstic acid or phosphotungstic acid in a molar ratio of from about 1 to about 24 moles of melamine per mole of the tungsten compound to prepare "melamine salts" of the tungstic acids. It is preferred that the contacting be carried out at about 50° C. to about 100° C. It is believed that the melamine not only forms salts with the (D tungsten compound used, but also solvates the resulting salt much like water forms hydrates. Cyanuric acid may also be present so that the melarmine forms a "mixed salt" with cyanuric acid and the silico- or phosphotungstic acid.

It has also been discovered that for compositions that include a synthetic, aliphatic polyamide and a glass or mineral reinforcing agent, melamine polyphosphate alone is effective as a flame retardant to obtain UL-94 V0 if used in a proportion of about 25 to about 30 weight percent. As discussed above, an amount of melamine polyphosphate of about 5 weight percent or above may be effective to pass a less stringent flame retardant test such as the glow wire test.

The compositions described herein have improved fire resistance compared to the resin alone, and are particularly useful as molding resins for making parts such as electrical and electronic parts such as bobbins, coil forms, connectors, fasteners, and for parts in equipment such as circuit breakers. These compositions also retain the good physical properties of the resins, that is desirable mechanical properties particularly toughness. Toughness may be roughly estimated as being proportional to the product of the tensile strength and elongation, so the higher either or both of these are, the tougher the polymer. It is preferred that the composition be fire resistant enough so that it has a rating of V0 in the Underwriters Laboratory test UL-94, at a thickness of 0.16 cm (¹⁄₁₆ inch).

It is well known that lower levels of the flame retardants disclosed herein may be successfully used to prepare compositions which meet flame retardant tests less demanding than Underwriters Laboratory test UL-94. For example, lower amounts of the inventive flame retardants may be used in combination with a resin and a reinforcing agent and still pass the glow wire test under less demanding conditions, specifically at temperatures lower than 960° C. and/or at higher thicknesses than 1.5 mm.

It is also preferred that the melamine phosphate compound, reinforcing agent and flame retardant, such as the charring catalyst, be relatively well dispersed in the resin. A preferred degree of dispersion can be attained by producing the composition in any of a number of different types of equipment which are commonly used to disperse materials in polymers. For instance, a twin screw extruder with appropriate mixing screw sections can be used to satisfactorily melt mix the ingredients. It is also believed that the dispersion of the charring catalyst in the polymer is aided by starting with tungsten compound having relatively small particle sizes.

It has also been discovered that the elongation of molded bars made from the inventive composition may be unexpectedly increased by adding to the composition a compatabilizer such as a silane compound. An example of an acceptable silane compound is triethoxy(3-aminoproply) silane sold under the trade name A1100 by Aldrich Chemical Company of Milwaukee, Wis. The silane compound may be added to the composition by any conventional method. A preferred method is that the silane is first coated onto the melamine polyphosphate compound before the melamine polyphosphate compound is added to the other components of the inventive composition. Alternatively, the silane may be added to the resin and/or reinforcing agent, which is then mixed with the melamine polyphosphate compound.

The silane compound may be present in any amount up to about 0.4 weight percent, based on the total weight of the resin, reinforcing agent, flame retardant and silane compound only. A preferred range is from 0.01 to 0.4 weight percent, and a more preferred range is from 0.1 to 0.3 weight percent.

In a preferred embodiment, a flow enhancer may be added to the composition to improve the flow. An example of an acceptable flow enhancer is dodecanedioic acid (DDDA), available from E.I. du Pont de Nemours and Company of Wilmington, Del. When a flow enhancer is used with the compositions of the invention, it is preferred that the flow enhancer be used in an amount of from about 0.25 to about 0.5 weight percent, based only on the total weight percent of the resin, reinforcing agent, flame retardant and, if present, silane compound.

EXAMPLES

The following abbreviations are used in the Examples and the Tables set out below:

STA—silicotungstic acid
NYADG—wollastonite
PBT—polybutylene terephthalate
PET—polyethylene terephthalate
MPOP—melamine polyphosphate,
VALOX 307—PBT made by GE, (Schenectady, N.Y.)
HTN—High Temperature Nylon 501 by DUPONT, (Wilmington, Del.)

Unless otherwise indicated, the following procedure was used in the examples. The resin used in the Example was both resin pellets and ground resin, and then the resin, a reinforcing material, a melamine polyphosphate compound, a charring catalyst, a charring catalyst and a char former, were thoroughly mixed, which usually took about 30 minutes. In the examples where a doped melamine compound was used, the doped melamine compound was prepared as set forth in the Example, and then was thoroughly mixed with the resin and reinforcing material.

The resin mixture was then dried under standard conditions, and then extruded on either a 28 mm or a 30 mm Werner & Pfleiderer twin screw extruder, using a screw design having a mid range screw severity, at a melt temperature of 270–300° C., and at rates of 11.3–15.9 kg per hour. Bars of $\frac{1}{16}$" were molded on a 0.043 kg (1.5 oz) molding machine. Standard molding conditions for the resin mixtures were used.

These resin mixtures were then molded into bars using typical injection molding machines, ranging from laboratory sized machines to commercial sized machines. Melt temperatures were typically about 280–300° C., and mold temperatures were typically 45–100° C. The molded bars were then tested for a flammability rating in the UL-94 test at 0.16 cm thickness, unless otherwise indicated.

Examples: Nylon6,6 Resin

In the following examples, Zytel 101® nylon 6,6 resin sold by DuPont was used. The data are summarized in Table 1. The reenforcement is either glass (PPG 3540) or NYADG.

Table 1 sets forth the compositions of the following Examples 1–4 using aliphatic polyamide.

Example 1

MPOP/char catalyst

A molded bar was made with melamine polyphosphate doped with a 25 charring catalyst. 385 g of melamine and 423 g polyphosphoric acid was dissolved in 2500 g of methanol. 15 g STA was added and the mixture was stirred overnight. It was filtered and dried in a vac oven 90° C. The composition was found to perform at a rating of UL94VO.

Example 2

MPOP

A molded bar was made with melamine polyphosphate doped with a charring catalyst. The preparation of melamine polyphosphate was done by first adding 65 gallons hot water to a large tank. Next, 4,600 g HCl (37% concentration) was added, then 12.95 lbs of melamine and 11.75 lbs of Hexaphos® from FMC. Stir and heat for 3 hours. Then the NaCl was filtered out via washing. The product was dried in a vac oven. The composition had a rating of UL94VO.

Example 3

MPOP

A molded bar was made with melamine polyphosphate (from example 2). The melamine polyphosphate was heated at 270° C. for 30 minutes. The composition was rated "V0".

Example 4

MPOP

A molded bar was made with melamine polyphosphate (from example 2). The melamine polyphosphate was heated at 270° C. for 30 minutes. The position was rated "V0".

TABLE 1

Examples 1–4

Composition (Wt. %)

| Exam. No. | Nylon 6,6 Pellet | Nylon 6,6 Powder | Flame Retardant Type | Flame Retardant Amount | Filler Type | Filler Amount |
|---|---|---|---|---|---|---|
| 1 | 20 | 30 | MPOP/STA | 25 | glass | 25 |
| 2 | 20 | 30 | MPOP | 25 | glass | 25 |
| 3 | 20 | 30 | MPOP | 25 | glass | 25 |
| 4 | 20 | 30 | MPOP | 25 | NYADG | 25 |

Example 5

Polyester

A molded bar was made using Rynite® 3934 polyester resin and the melamine polyphosphate from Example 2. Proportions were PET pellets, 20%; PET powder, 30%; MPOP, 25%; and glass, 25%. The composition had a rating of UL94V0.

Example 6

Polybutylene terephthalate (PBT).

A molded bar was made with MPOP (from Example 2). The composition was 20% PBT pellets (GE VALOX); 25% PBT powder (GE VALOX), 30% MPOP, and 25% glass (PPG 3563). It had a rating of UL94VO.

Example 7

PBT

A molded bar was made with MPOP (from Example 2). The composition the same as Example 6 except that the MPOP was heated at 270° C. for 30 minutes. It had a rating of UL94VO.

Example 8 high temperature nylon (HTN)

A molded bar was made with melamine polyphosphate (from Example 2). 30 The composition was 25% HTN 501 pellets, 25% HTN 501 powder, 25% MPOP and 25% glass (PPG 3540). It had a rating of UL94VO.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

In addition to the components discussed above, the compositions of this invention may contain additives commonly employed with synthetic resins, such as colorants, mold release agents, antioxidants, tougheners, nucleating agents, ultraviolet light and heat stabilizers and the like. An example of a common filler is magnesium hydroxide.

What is claimed is:

1. A melt processable, injection moldable composition comprising:
   (1) about 30 to about 70 weight percent of a polymer selected from the class consisting of polyesters, synthetic aliphatic polyamides and synthetic aliphatic aromatic polyamide copolymers, or a mixture thereof;
   (2) about 15 to about 40 weight percent of a reinforcing agent; and
   (3) a flame retardant selected from the group consisting of
      (a) about 20 to about 45 weight percent of melamine polyphosphate;
      (b) about 15 to about 30 weight percent of melamine polyphosphate plus up to about 10 weight percent of a charring catalyst which is sodium tungstate, silicotungstic acid, phosphotungstic acid or mixtures thereof;
      (c) about 15 to about 30 weight percent of melamine polyphosphate, up to about 10 weight percent of a said charring catalyst and up to about 10 weight percent of a char former which is pentaerythritol, dipentaerythritol, or mixtures thereof,
   wherein all percents by weight are based on the total weight of (1)+(2)+(3) only.

2. The composition of claim 1 wherein the amount of the charring catalyst is about 0.1 to about 10 weight percent.

3. The composition of claim 2 wherein the amount of the charring catalyst is about 0.1 to about 2 weight percent.

4. The composition of claim 1 wherein the char former is pentaerythritol.

5. The composition of claim 1 wherein the amount of the char former is about 0.1 to about 10 weight percent.

6. The composition of claim 5 wherein the amount of the char former is about 0.1 to about 2 weight percent.

7. The composition of claim 1 wherein said aliphatic polyamide is nylon-6,6, nylon-6, copolymers thereof or mixtures thereof and the amount of flame retardant is 25–30%.

8. The composition of claim 1 wherein said polyester is polyethylene terephthalate, polybutylene terephthalate, polyethylene terephthalate/polybutylene terephthalate copolymers or polyethylene terephthalate/polybutylene terephthalate mixtures.

9. The composition of claim 8 wherein the flame retardant is melamine polyphosphate.

10. The composition of claim 9 wherein the melamine polyphosphate is present in an amount of about 25 to about 45 weight percent.

11. The composition of claim 1 wherein said reinforcing agent is glass, carbon, mica, aramid fibers or mixtures thereof.

12. The composition of claim 1, wherein the composition comprises a mixture of about 60 weight percent or greater of a polyester and up to about 40 weight percent of a synthetic, aliphatic polyamide.

13. The composition of claim 1 wherein said polymer is an aliphatic aromatic polyamide compolymer.

14. A molded article made from the composition of any of claims 1, 2–3, and 4–13.

* * * * *